United States Patent
Gross

[15] 3,682,576
[45] Aug. 8, 1972

[54] SEGMENTED MOLD

[72] Inventor: Werner L. Gross, Fleestedt, Germany

[73] Assignee: Akron Standard, division of Eagle-Picher Industries, Inc., Cincinnati, Ohio

[22] Filed: Feb. 10, 1971

[21] Appl. No.: 114,243

[52] U.S. Cl. .....................425/46, 425/450, 425/47
[51] Int. Cl. .............................................B29h 5/02
[58] Field of Search.........18/17 K, 17 W, 17 T, 42 T, 18/DIG. 5

[56] References Cited

UNITED STATES PATENTS

| | | | |
|---|---|---|---|
| 2,948,031 | 8/1960 | Webb | 18/DIG. 5 |
| 3,337,918 | 8/1967 | Pacciarini et al. | 18/17 K |
| 3,396,221 | 8/1968 | Balle et al. | 18/17 K X |
| 3,464,090 | 9/1969 | Cantarutti | 18/17 K |

FOREIGN PATENTS OR APPLICATIONS

| | | | |
|---|---|---|---|
| 771,553 | 11/1967 | Canada | 18/17 K |
| 1,437,222 | 3/1966 | France | 18/17 K |
| 1,928,829 | 12/1970 | Germany | 18/42 T |
| 975,644 | 11/1964 | Great Britain | 18/17 K |
| 1,039,049 | 8/1966 | Great Britain | 18/44 |
| 1,096,189 | 12/1967 | Great Britain | 18/17 K |

*Primary Examiner*—J. Howard Flint, Jr.
*Attorney*—Mack D. Cook, III

[57] ABSTRACT

Mold for vulcanizing radial tires and having fixed and movable sidewall matrices with radially movable tread forming matrices. Tread segments are carried by an annular piston housed within a chamber in the mold body. The chamber is closed by a member guiding the piston and sealing the mold cavity when the press is closed. Fluid pressure introduced into the chamber actuates the piston for selective radial movement of the tread forming matrices.

3 Claims, 5 Drawing Figures

INVENTOR.
WERNER L. GROSS
BY Hamilton, Cook,
Renner & Kenner
ATTORNEYS

INVENTOR.
WERNER L. GROSS
BY Hamilton, Cook,
Renner & Renner
ATTORNEYS

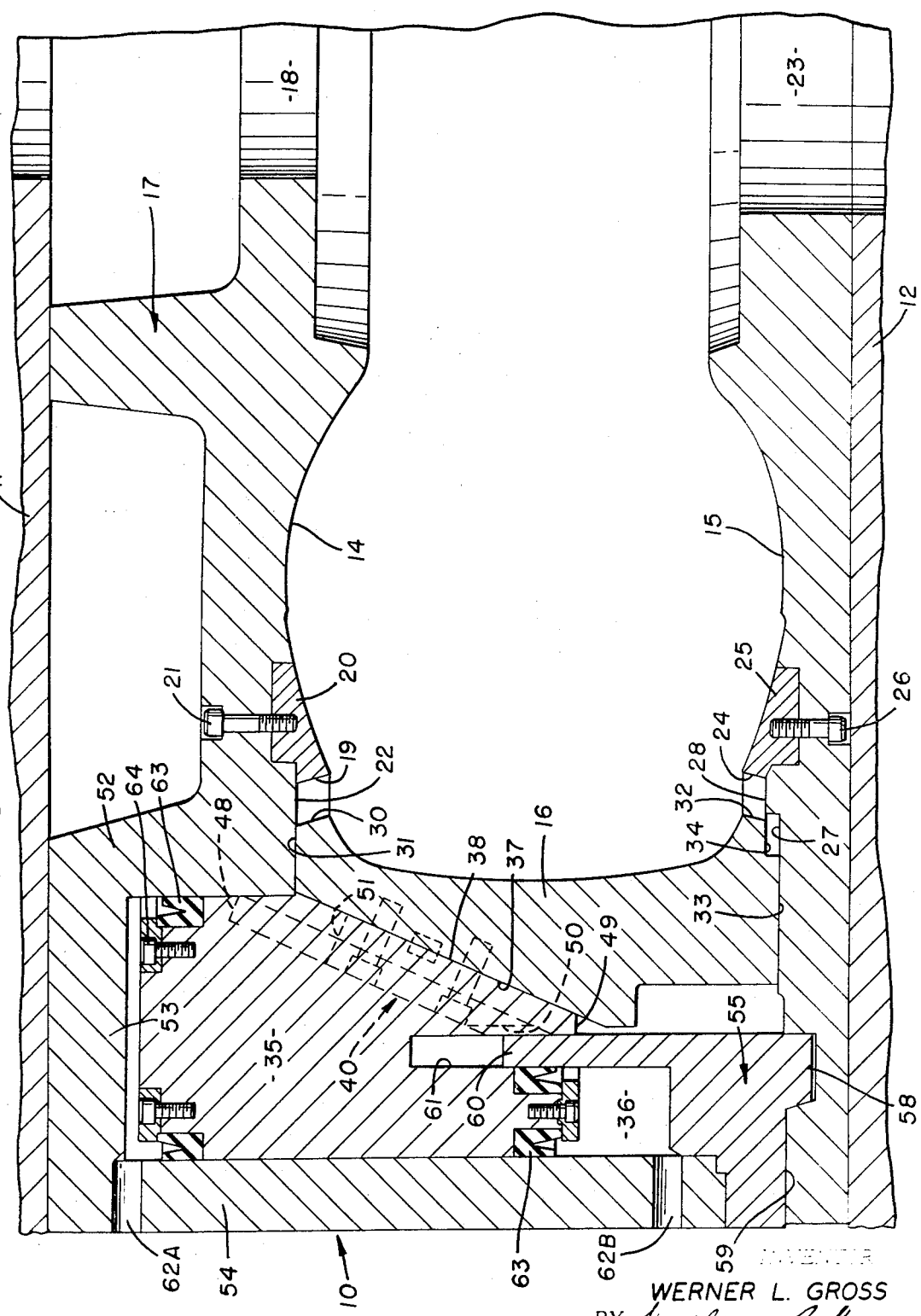

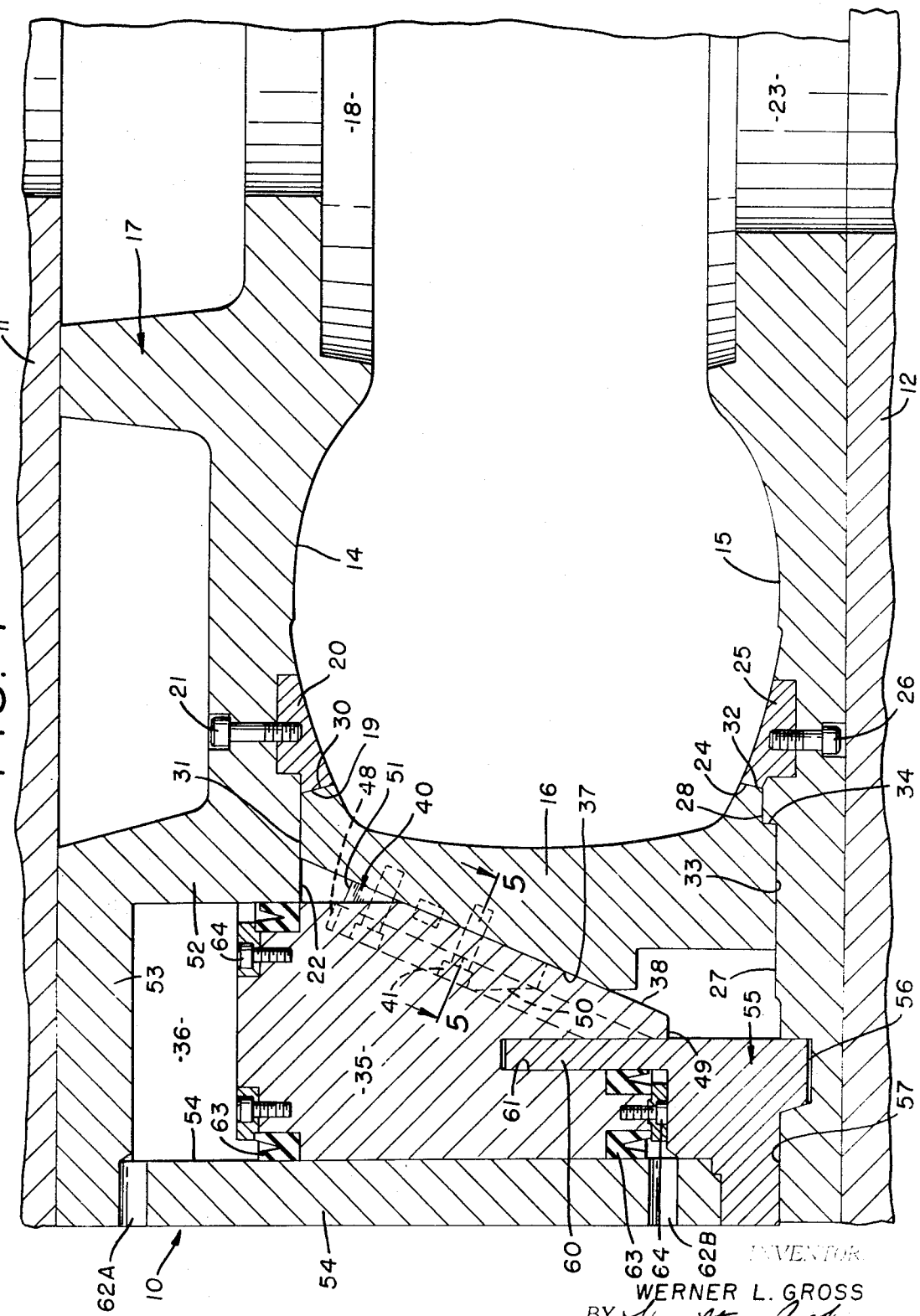

SEGMENTED MOLD

BACKGROUND OF THE INVENTION

Molds for vulcanizing "pre-formed" or "semi-toroidal" tire carcasses in presses are well known and generally old in the art. See a 1915 patent to A. W. Finlayson, U.S. Pat. No. 1,132,500, which discloses a mold having opposed sidewall matrices (19) with radially movable segmented tread forming matrices (17).

The teachings of U. S. Pat. No. 1,132,500 were rediscovered in connection with design, construction and operation of segmented molds for vulcanizing radial tires. See recent U. S. Pats. No. 3,337,918 and No. 3,458,612, which disclose having the opposed sidewall matrices fully enclose the tire carcass before radially inward movement of the segmented tread forming matrices.

Vulcanization of radial tires requires that the fabric or wire belt beneath the tread circumferentially around the body plies not be displaced during the operations of final shaping and curing. Also, a segmented vulcanizing mold should operate with minimum "flash" at the mold parting lines, with minimum wear on mating sliding surfaces and through the wide range of fluid pressures and temperatures present during a vulcanization operation.

SUMMARY OF THE INVENTION

The object of the invention is to provide an improved mold for vulcanizing radial tires. More particularly, the object is to provide segmented mold components for use in new presses or to "retro-fit" existing presses. Specifically, it is an object to provide a segmented mold for radial tires which will operate with minimum flash at the mold parting lines, with minimum wear on mating or sliding surfaces and through the wide range of fluid pressures and temperatures present during a vulcanization operation.

These and other objects of the invention, and the advantages thereof, will be apparent in view of the description of a preferred embodiment as set forth below.

In general, a vulcanizing mold according to the invention is used with a press having a cross beam, carrying a mold body member, and a mold support assembly. The mold has a cavity defined by opposed fixed and movable annular sidewall matrices and a segmented tread forming matrix movable relative the sidewall matrices. The movable sidewall matrix is carried on the mold body member. The fixed sidewall matrix is carried on the mold support assembly.

A vulcanizing mold according to the invention is characterized in that the segments of the tread forming matrix are carried on the radially inner face of an annular piston housed within a chamber in the mold body member. The piston is selectively actuated by fluid pressure introduced into the chamber for radial movement of the segments.

A vulcanizing mold according to the invention is further characterized in that the end of the chamber adjacent the mold support assembly is formed by a member both guiding movement of the piston and interfitting with the mold support assembly when the press is closed.

DESCRIPTION OF THE DRAWINGS

FIG. 3 is an enlarged fragmentary view showing the vulcanizing mold with the sidewall matrices in closed position and prior to radially inward movement of the tread matrices;

FIG. 4 is a view sequentially following FIG. 3 showing the vulcanizing mold in fully closed position.

DESCRIPTION OF A PREFERRED EMBODIMENT

Figure 1:
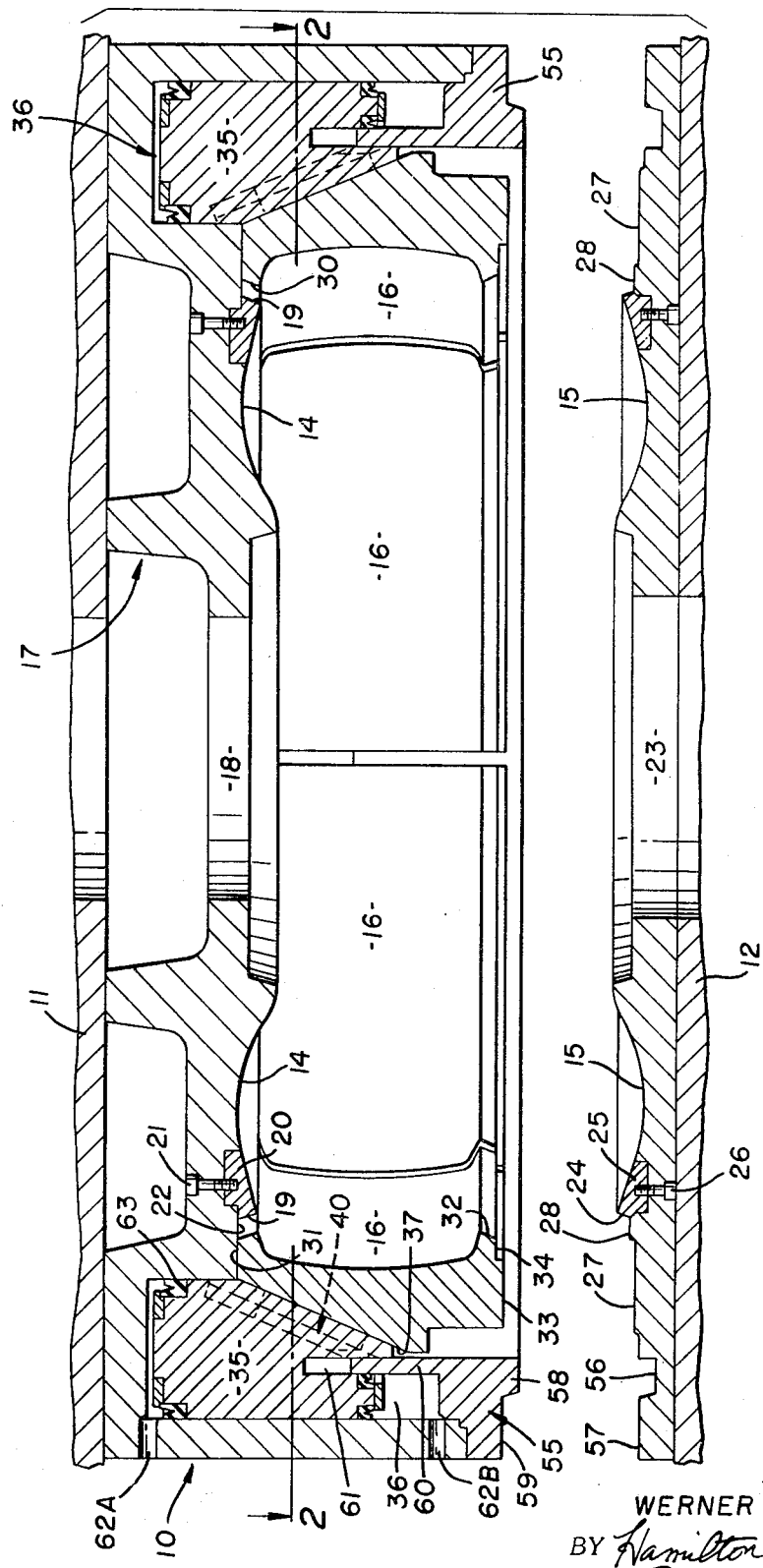
FIG. 1 is a fragmentary view in cross-section of a vulcanizing mold according to the invention.

A tire vulcanizing mold according to the invention is indicated generally by the numeral 10. As shown, the mold 10 is used with a conventional tire vulcanizing press having a movable cross beam 11, a mold support assembly or base 12 beneath the cross beam and a center or shaping mechanism (not shown). Reference may be made to U. S. Pat. No. 2,997,738 (and the patents identified therein) for such further details of vulcanizing press operation and discussion as may be required to understand the invention.

The mold 10 has a cavity for the vulcanization of tires as defined by a movable sidewall matrix 14, an opposed sidewall matrix 15 and the tread forming matrices of a series of segments 16 movable relative the sidewall matrices 14 and 15.

The movable sidewall matrix 14 is carried on a mold body member 17, preferably attached by suitable means (not shown) to the movable press cross beam 11. The mold body 10 has an open center 18 adapted as required to accommodate components (not shown) of the press center mechanism. Radially around the open area 18 is the annular surface forming the matrix 14. The outer edge of the matrix 14 terminates in a downwardly tapered or axially inclined surface 19 for mating engagement with a corresponding surface on the segments 16.

As shown, the surface defining the matrix 14 may be formed by replaceable inserts such as an annular element 20, attached as by bolts 21, for molding a portion of the upper sidewall of a tire. The mold body 17 further has an annular surface 22 extending radially of the matrix edge surface 19 for sliding engagement with a corresponding surface on the segments 16.

The fixed sidewall matrix 15 is carried on the press base 12 and attached thereto by suitable means (not shown). The press base 12 has an open area 23 adapted as required to accommodate components (not shown) of the press center mechanism. Radially around the open area 23 is the annular surface forming the matrix 15. The outer edge of the matrix 15 terminates in an upwardly tapered or axially inclined surface 24 for mating engagement with a corresponding surface on the segments 16.

As shown, the surface defining the matrix 15 may be formed by replaceable inserts such as an annular element 25, attached as by bolts 26, for molding a portion of the lower sidewall of a tire. An annular surface 27 extends radially of the matrix edge surface 24 for sliding engagement with a corresponding surface on the segments 16. As shown, the radially inner side of surface 27 may be provided with an abutment 28 providing means for precise registry of the segments 16 in the radially inward or mold closed position.

Figure 2:
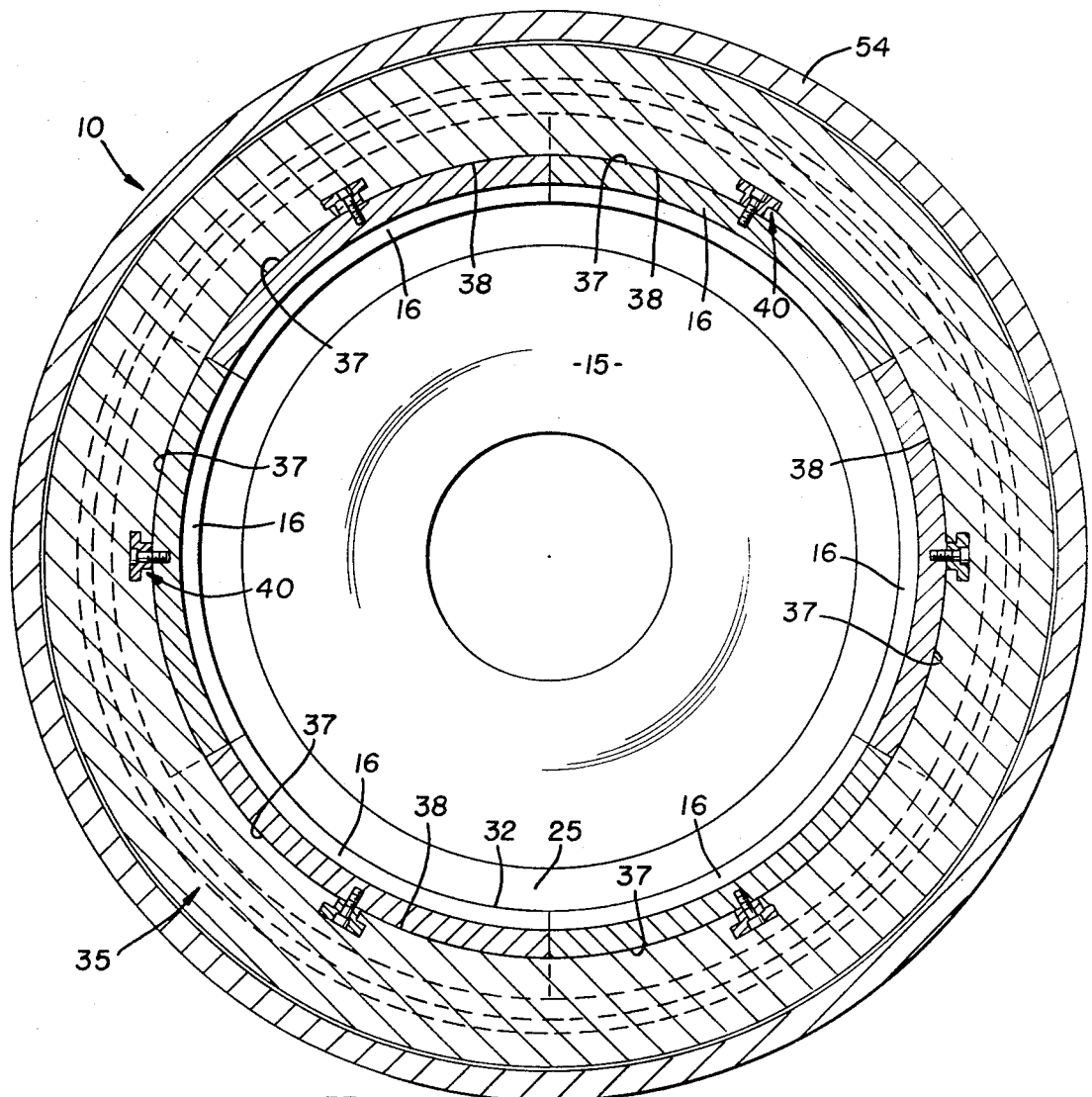
FIG. 2 is a top plan view taken substantially as indicated on line 2—2 in FIG. 1.

As shown (see FIG. 2), there may be six segments 16 having mating surfaces defining the tread forming matrix. The upper portion of each segment has a downwardly tapered or inclined surface 30 for mating engagement with the upper matrix edge surface 19. Radially around the mating surface 30 is an annular surface 31 for sliding engagement with the upper surface 22.

The lower portion of each segment 16 has an upwardly tapered or axially inclined surface 32 for mating engagement with the lower matrix edge surface 24. Radially around the mating surface 32 is an annular surface 33 for sliding engagement with the lower surface 27. As shown, the radially inner side of surface 33 may be provided with a notch 34 for mating engagement with the abutment 28.

The series of segments 16 are movably carried by an annular piston, indicated generally by the numeral 35. The piston 35 is housed within a chamber, indicated generally by the numeral 36, in the mold body member 17 radially of the annular surface 31. Fluid pressure introduced into the chamber 36, as described in detail below, actuates the piston for selective radial movement of the segments 16.

The radially outer side of each segment 16 has a downwardly tapered or axially inclined curved surface 37. Each segment surface 37 moves along a corresponding conical surface 38 on the radially inner face of the piston 35. Each segment 16 is positioned for sliding engagement with the piston 35 by an elongated guide means, indicated generally by the numeral 40.

Figure 5:
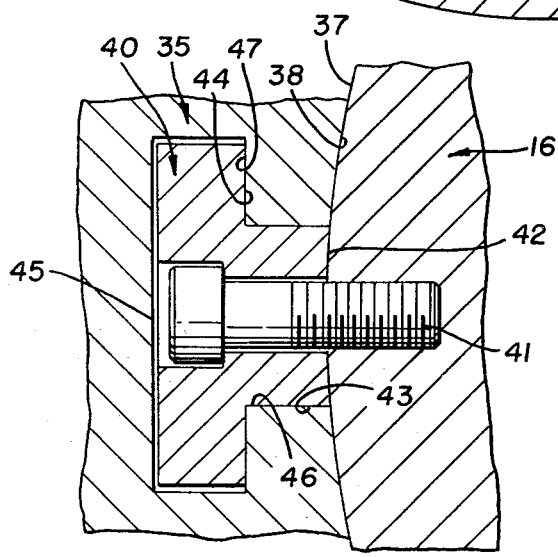
FIG. 5 is an enlarged fragmentary plan view taken substantially as indicated on line 5—5 of FIG. 4.

Referring to FIG. 5, the guide means 40 may be a T-head bar attached as by bolts 41 to a segment 16. Each bar 40 has a base surface 42 conforming to a segment surface 37, parallel side surfaces 43 and flange surfaces 44. Each bar 40 is slidably received in a corresponding T-shaped slot 45. Each slot 45 has parallel side surfaces 46 and lateral surfaces 47 for sliding engagement with the mating bar surfaces 43 and 44, respectively.

Referring to FIGS. 3 and 4, the downwardly directed or axially inclined guide slots 45 are closed at the upper end 48 and open at the lower end 49. The lower end of each guide bar 40 has a tapered or vertically directed surface 50. The upper end of the guide bar 40 has a transverse or axially inclined surface 51.

The upper end of the annular chamber 36 housing the piston 35 is formed by the intersecting surfaces of a radially inner wall 52, a transverse wall 53 and a radially outer wall 54. The lower end of chamber 36 is formed by a member, indicated generally by the numeral 55. The member 55 is securely attached to the lower end of the outer wall 54.

The chamber member 55 is adapted to interfit with the mold support assembly 12, or components thereon, when the press is closed. As shown, radially of annular surface 27 adjacent the fixed sidewall matrix 15 are an annular groove 56 and a radially directed surface 57. A corresponding annular flange 58 and surface 59 on the under surface of member 55 are brought into seating engagement therewith when the press is closed.

The chamber member 55 is also adapted to guide movement of the piston 35. As shown, the upper surface of member 55 has a vertically directed annular flange 60 for insertion within a corresponding notch 61 in the under surface of the piston 35.

The piston 35 is selectively actuated by fluid pressure introduced into the chamber 36 for radial movement of the segments 16. As shown, fluid under pressure (e.g., steam, air or liquid) is selectively supplied to or discharged from opposite ends of the chamber 36 through ports or openings 62A and 62B in the outer wall 54. The ports 62 are provided with suitable fittings (not shown) connected as required to a remote source of fluid under pressure. Also as required, the upper and lower ends of the piston 35 are fitted with suitable pressure fluid seals 63, removable for maintenance or replacement and secured as by keeper rings and bolts 64.

DESCRIPTION OF OPERATION OF A MOLD 10

After the unvulcanized radial tire carcass has been loaded in the press, in a manner such as disclosed in U. S. Pat. No. 2,997,738, the center mechanism will position the tire carcass relative to the fixed matrix 15. As the press enters the final closing phase, the piston 35 will be at the uppermost position within chamber 36, as by supply of fluid pressure into port 62B and exhaust from port 62A. The segments 16 will be at the radially outermost positions, the surfaces 31 sliding against surface 22. When the segments 16 contact the lower surface 27 (the condition illustrated in FIG. 3), downward or vertical movement will cease.

As the press enters the final closing phase, supply of fluid pressure into port 62A and exhaust from port 62B will move the segments 16 to the radially innermost position (the condition illustrated in FIG. 4). During the curing cycle of the press, the fluid pressure in the upper end of chamber 36 will maintain the various mating surfaces — 19–30, 24–32, 28–34, 56–58, and 57–59, in exact and precise registry.

I claim

1. A mold for use with a press having a cross beam, carrying a mold body member, and a mold support assembly, said mold having a cavity for tire vulcanization defined by opposed fixed and movable annular sidewall matrices and a segmented tread forming matrix movable relative the sidewall matrices, the movable sidewall matrix being carried on the mold body member, the fixed sidewall matrix being carried on the mold support assembly, wherein the segments of the tread forming matrix are carried on the radially inner face of an annular piston housed within a chamber in the mold body member, the piston being selectively actuated by fluid pressure introduced into the chamber for radial movement of the segments.

2. A mold according to claim 1, wherein the end of the chamber adjacent the mold support assembly is formed by a member both guiding movement of the piston and interfitting with the mold support assembly when the press is closed.

3. A mold according to claim 1, wherein each segment of the tread forming matrix has attached thereto guide means slidably received in a corresponding slot in the radially inner face of the piston.

* * * * *